(12) United States Patent
Weiss et al.

(10) Patent No.: US 11,867,531 B2
(45) Date of Patent: Jan. 9, 2024

(54) TRANSDUCER MAGNET ASSEMBLY AND MOUNTING METHOD

(71) Applicant: ZF Friedrichshafen AG, Friedrichshafen (DE)

(72) Inventors: Martin Weiss, Markdorf (DE); Maximilian Scheufler, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 80 days.

(21) Appl. No.: 16/961,021

(22) PCT Filed: Jan. 9, 2019

(86) PCT No.: PCT/EP2019/050429
§ 371 (c)(1),
(2) Date: Jul. 9, 2020

(87) PCT Pub. No.: WO2019/137950
PCT Pub. Date: Jul. 18, 2019

(65) Prior Publication Data
US 2020/0340835 A1    Oct. 29, 2020

(30) Foreign Application Priority Data
Jan. 15, 2018   (DE) ............... 10 2018 200 564.8

(51) Int. Cl.
G01D 11/30 (2006.01)
(52) U.S. Cl.
CPC .................. G01D 11/30 (2013.01)

(58) Field of Classification Search
None
See application file for complete search history.

(56) References Cited

U.S. PATENT DOCUMENTS

| | | | |
|---|---|---|---|
| 4,529,075 A | 7/1985 | Renaud | |
| 7,287,422 B2 | 10/2007 | Bader et al. | |
| 7,795,771 B2 * | 9/2010 | Lott ................ | H02K 1/2733 310/68 R |
| 10,288,450 B2 | 5/2019 | Forthaus | |

(Continued)

FOREIGN PATENT DOCUMENTS

| | | |
|---|---|---|
| CN | 1728042 A | 2/2006 |
| CN | 201927758 U | 8/2011 |

(Continued)

OTHER PUBLICATIONS

Neubauer Hans-Juergen et al. ; Fastening Device For Fastening Signal Transmitter Element, Particularly Magnet At Moving Component In One Direction, Comprises Spring Element, Holding Element And Receiver Which Comprises Receiving Element; Date Published Apr. 5, 2012; DE 102011114394 A1; F 16 H 59/70 (Year: 2012).*

(Continued)

Primary Examiner — Nasima Monsur
(74) Attorney, Agent, or Firm — Finch & Maloney PLLC (57) ABSTRACT

A transducer magnet assembly (1) on a shifting rail (9) having a transducer magnet (4) which is held by a magnet support (3), and a coupling ring (2). The coupling ring (2) surrounds the shifting rail (9) and the magnet support (3) locks the coupling ring (2) so that the coupling ring (2) is held onto the shifting rail (9).

15 Claims, 5 Drawing Sheets

(56) References Cited

U.S. PATENT DOCUMENTS

| | | | |
|---|---|---|---|
| 10,295,372 B2 | 5/2019 | Kishi et al. | |
| 2012/0194011 A1* | 8/2012 | Liu | H02K 1/278 |
| | | | 310/156.01 |
| 2015/0110553 A1* | 4/2015 | Hernandez-Oliver | |
| | | | G01D 5/145 |
| | | | 403/376 |
| 2020/0153326 A1* | 5/2020 | Yang | F16H 1/14 |

FOREIGN PATENT DOCUMENTS

| | | |
|---|---|---|
| CN | 202521461 U | 11/2012 |
| CN | 102953594 A | 3/2013 |
| CN | 104564980 A | 4/2015 |
| CN | 107104312 A | 8/2017 |
| DE | 10 2005 004 489 A1 | 8/2006 |
| DE | 20 2005 020 855 U1 | 10/2006 |
| DE | 10 2005 038 516 A1 | 2/2007 |
| DE | 10 2011 114 394 A1 | 4/2012 |
| DE | 10 2015 101 248 A1 | 7/2016 |
| DE | 10 2017 208 153 A1 | 11/2017 |
| EP | 3 060 833 B1 | 9/2017 |
| IT | 1159179 B | 2/1987 |

OTHER PUBLICATIONS

Stotz Oliver et al.; Speed Detection Device; DE 4040287 C2; Date Published Feb. 22, 2001; G01P3/495 (Year: 2001).*
Froehlich Ekkehart et al.; Device For Detecting Revolutions Of A Steering Shaft; Date Published Feb. 8, 2007; DE 102005038516 A1; CPCI G 01 D 5/145 (Year: 2007).*
Ярмолович Вячеслав Алексеевич; Information Entry Key; Date Published Apr. 30, 2014 (Year: 2014).*
German Search Report Corresponding to 10 2018 200 564.8 dated Dec. 9, 2019.
International Search Report Corresponding to PCT/EP2019/050429 dated Apr. 8, 2019.
Written Opinion Corresponding to PCT/EP2019/050429 dated Apr. 8, 2019.
Chinese Office Action Corresponding to 201980008577.8 dated Jul. 20, 2022.

* cited by examiner

TRANSDUCER MAGNET ASSEMBLY AND MOUNTING METHOD

This application is a National Stage of PCT/EP2019/050429 filed Jan. 9, 2019, which claims priority from patent application serial no. 10 2018 200 564.8 filed Jan. 15, 2018.

FIELD OF THE INVENTION

The invention relates to a transducer magnet assembly, a corresponding path sensor arrangement, and an associated mounting method.

BACKGROUND OF THE INVENTION

Path sensors and associated transducer elements are used in a variety of technical application fields. A typical such field is in transmissions, in which the gearwheels are shifted by means of shifting forks which are connected to manually, semi-automatically or automatically actuated, longitudinally displaceable shifting rails. The displacement path of a shifting rail detected by means of the path sensor arrangement is processed further as a path signal in a function control system, for example in order to optimize the synchronization process in a synchronized multi-gear transmission.

In conventional path sensor arrangements a sensor is mounted on a first component and, separately from that, a transducer element is mounted on a second component. The term sensor or sensor element is understood to mean the part of the path sensor arrangement which detects the path of the transducer element and passes it on in the form of a path signal to a control unit. The term transducer is understood to mean that part of the path sensor arrangement which moves along with the change of condition and thereby generates a path signal, which can be detected or read by the sensor. Instead of transducer, for example the term signal emitter or signal emitter element can be used.

DE 102005004489 A1 describes a path sensor arrangement with a sensor carriage which is mounted, for example, on a shifting rail. The sensor housing and the sensor carriage form an inseparable assembly made in accordance with the rules of precise instrument construction, wherein during the mounting of the path sensor arrangement the sensor carriage is connected to move together with that component whose displacement movement is to be measured. In that way assembly is simplified and made more reliable, and interface and air-gap tolerance problems are reduced. The sensor carriage must at all times remain connected securely to the sensor housing.

DE 10 2011 114 394 A1 describes a fastening device for fixing a transducer element, in particular a magnet, to a component that can move in at least one direction, whose position relative to a detection element can be detected by means of a signal emitter element. The fastening device comprises at least one spring element, a holding element and a receiving element with a holder, in whose holder the transducer element is to be at least partially arranged and held by means of the holding element. The receiving element and the holding element that can be connected to the receiving element are held onto the component by means of the spring element.

SUMMARY OF THE INVENTION

The purpose of the present invention is to further improve the coupling of a transducer to a shifting rail in relation to costs and effort. At the same time, the assembly should be simple and problems relating to an air-gap between the sensor element and the transducer element should be mitigated.

This objective is achieved by virtue of the characteristics specified in the independent claims, while advantageous design features and further developments of the invention emerge from the respective dependent claims that follow them.

A transducer assembly on a shifting rail is proposed, comprising a transducer magnet held by a magnet support and a coupling ring, the coupling ring enclosing the shifting rail and the magnet support locking the coupling ring so that the coupling ring is held onto the shifting shaft.

As its name already indicates, the coupling ring is ring-shaped and it surrounds or encloses the shifting rail almost completely, or at least to the extent that the coupling ring can hold itself independently on the shifting rail. The ring is open on one side, so that it can be expanded for assembly purposes. On the open side of the coupling ring there is formed at each end of the ring a raised shape or projection for connecting the coupling ring to the magnet support.

The projections extend from the coupling ring radially outward. Each projection comprises at least one hook, otherwise also called a lip, by virtue of which the coupling ring can be locked. After assembly the magnet support encloses the two projections of the coupling ring in such manner that the two ends of the coupling ring and the two projections connected to them can no longer move apart from one another and the coupling ring can therefore not open or expand.

The magnet support surrounds the transducer magnet, at least partially. Here, the transducer magnet is positioned on a side of the magnet support that faces toward a sensor element opposite the side facing toward the shifting rail, and is held directly by the magnet support. Preferably, the magnet support is made of injection-molded plastic so that the magnet can be molded directly into it. The magnet can be embedded completely or only partially. Thus, the magnet is part of the magnet support and can be installed as a unit with the magnet support.

As described, the magnet support locks the coupling ring. This happens by virtue of a so-termed snap-on connection. For that, the magnet support is pushed over the two projections along the lateral surfaces of the projections of the coupling ring, so that the two projections hook over the magnet support as soon as the magnet support has been pushed over them. During this only radial movement of the magnet support toward or away from the shifting rail, guided by the lateral surfaces of the projections of the magnet support, can take place, which movement is restricted radially outward by the holding projections and radially inward by the coupling ring.

The coupling ring and/or the magnet support can preferably be made of injection-molded plastic.

The transducer magnet assembly can additionally comprise a spring element for sensor tolerance compensation. In that case the spring element can be arranged radially between the shifting rail and the magnet support, and can be in the form of a compression spring. Axially relative to the shifting rail, the spring element is preferably arranged centrally in the magnet support and perpendicularly to the shifting rail between two sides of the magnet support and thus between the two ends and the projections of the coupling ring. An alternative design of the spring element would be, for example, at least one plastic element, which is attached or injection-molded directly onto the magnet support and exerts the spring force. A spring element made of other materials which, however, would be at least partially injection-molded into the magnet support and therefore produced as one component together with the magnet support, would also be conceivable. By virtue of the projections on the coupling ring, the magnet support is locked by the spring force.

To assemble a transducer magnet assembly, the coupling ring is pushed onto the shifting rail by expanding the ring. The coupling ring is pushed on until an interior radius or interior ridge of the coupling ring latches into a correspondingly shaped groove or recess on the shifting rail and the expansion of the coupling ring is thereby relaxed completely or at least partially.

In the case of a separately made spring element, to assemble the magnet support and the spring element the spring element is fitted into the magnet support on the side facing away from the transducer element. This is done in a recess centrally in the transducer element, under the transducer magnet, where the spring element is held in its position by the magnetic force of the transducer magnet and then installed together with the magnet support as one structural unit. Alternatively, further holding projections could be arranged on the magnet support, which hold the spring element in the magnet support. In the case of a spring element made as one or more shaped plastic elements, which are part of the magnet support, the spring element does not need to be held on the magnet support. The magnet support and the spring element are made integrally and can be installed together as a structural unit. The structural unit consisting of the magnet support and the spring element is plugged onto the coupling ring against the force of the spring, and the coupling ring is locked by a snap-on connection with the projections of the coupling ring.

After complete fitting, the transducer magnet assembly is supported radially on the sensor element and axially by means of the groove on the shifting rail.

BRIEF DESCRIPTION OF THE DRAWINGS

The designs according to the invention are described further with reference to figures and explained in greater detail.

DETAILED DESCRIPTION OF THE PREFERRED EMBODIMENTS

Figure 1:
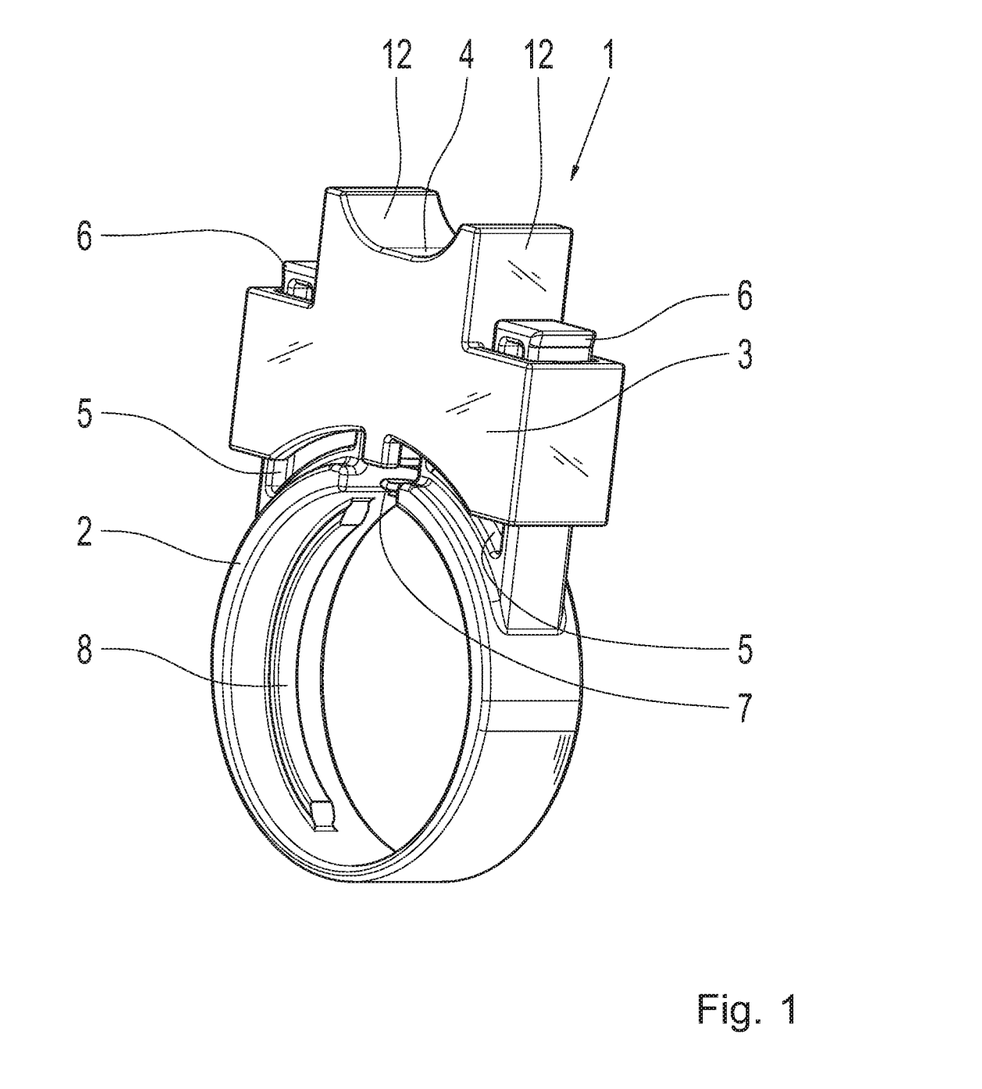
FIG. 1: Structure of a transducer magnet assembly according to the invention.

FIG. 1 shows a structure of a transducer magnet assembly 1 according to the invention. The transducer magnet assembly 1 comprises a coupling ring 2 which couples the transducer magnet assembly 1 to a corresponding shifting rail 9, and a magnet support 3 which accommodates a transducer magnet 4 on a side facing toward a sensor element 11 and facing away from the shifting rail 9. The transducer magnet 4 can be completely or only partially surrounded by the material of the magnet support 3 and is held directly or indirectly by the magnet support 3. At one point the coupling ring 2 is open, so that it can be expanded for fitting onto a shifting rail 9. At each end of the coupling ring 2 by the opening a projection 5 is formed, over which the magnet support 3 is pushed so that it keeps the coupling ring 2 closed. When the magnet support 3 has been fitted the coupling ring 2 can no longer be expanded. The projections 5 of the coupling ring 2 each have at least one lip 6, over which the magnet support 3 is pushed and by virtue of which a snap-on connection prevents the magnet support 3 on it from sliding off the coupling ring 2 again, over the projection 5. Thus, the magnet support 3 is prevented by the lips 6 from releasing the coupling ring 2, whereas it allows and enables a radial movement, namely a movement outward away from the shifting rail 9 or inward toward the shifting rail 9, guided by the projections 5. To compensate tolerances and sagging of the shifting rail 9 in its end stops, the magnet support 3 is pressed by a spring element 7 toward the sensor element 11 (not shown here). At the same time the spring element 7 has an effect on the mounting of the transducer magnet assembly 1. By virtue of the friction force on the bearing side of the shifting rail 9, the magnet support 3 is held in position in the circumferential direction in order to enable the covered fitting of the sensor element 11 after pre-positioning. On the inside of the coupling ring 2 an interior ridge 8 is formed, which can latch into a corresponding groove or recess 14 in the shifting rail 9 and in that way maintain with interlock the axial position of the coupling ring 2 on the shifting rail 9. In the area of the transducer magnet 4 the magnet support 3 has two sideplates 12, which serve to contact an associated sensor element 11 and are designed to provide radial support in the circumferential direction.

Figure 2:
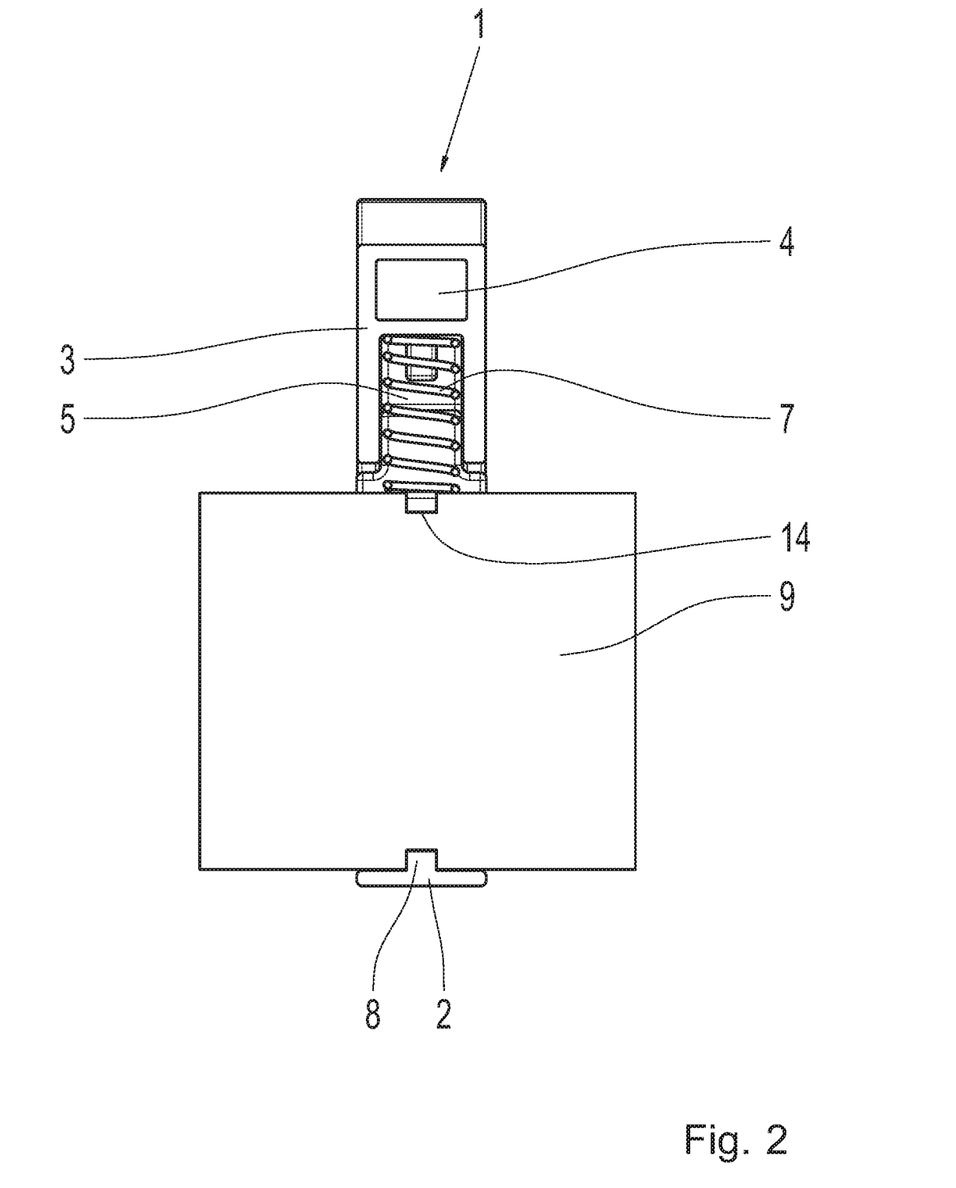
FIG. 2: A first sectioned view through the fitted transducer magnet assembly.

FIG. 2 shows a first sectioned view through an installed transducer magnet assembly 1. In this case the coupling ring 2 is mounted on the shifting rail 9 and is held in position axially by the interlocked connection of the interior ridge 8 of the coupling ring 2 and the groove 14 in the shifting rail 9. The magnet support 3 is fitted onto the coupling ring 2 and contains the transducer magnet 4, in such manner that the magnet support 3 is mounted so that it can move radially relative to the shifting rail 2 and is pressed by the spring element 7 in the direction toward a sensor element 11 (not shown here).

Figure 3:
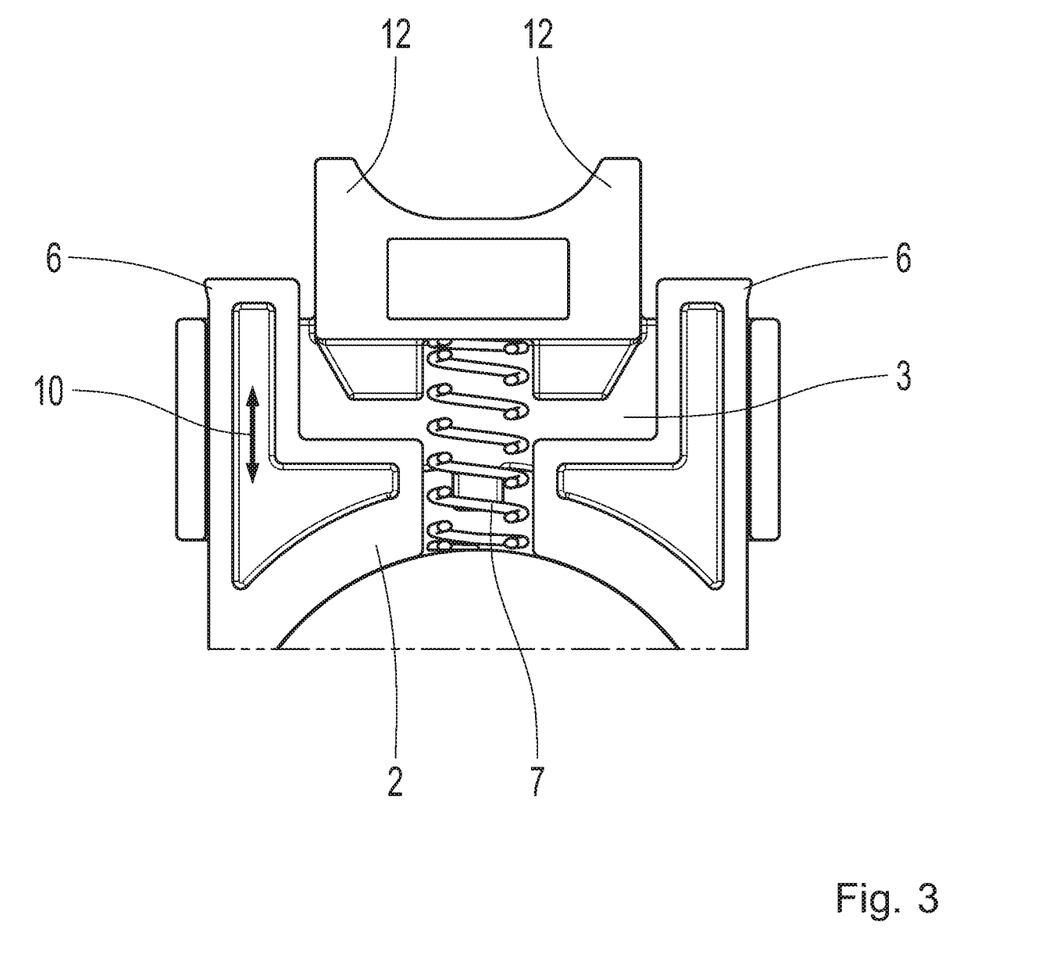
FIG. 3: Locking of the coupling ring with the magnet support.
Figure 4:
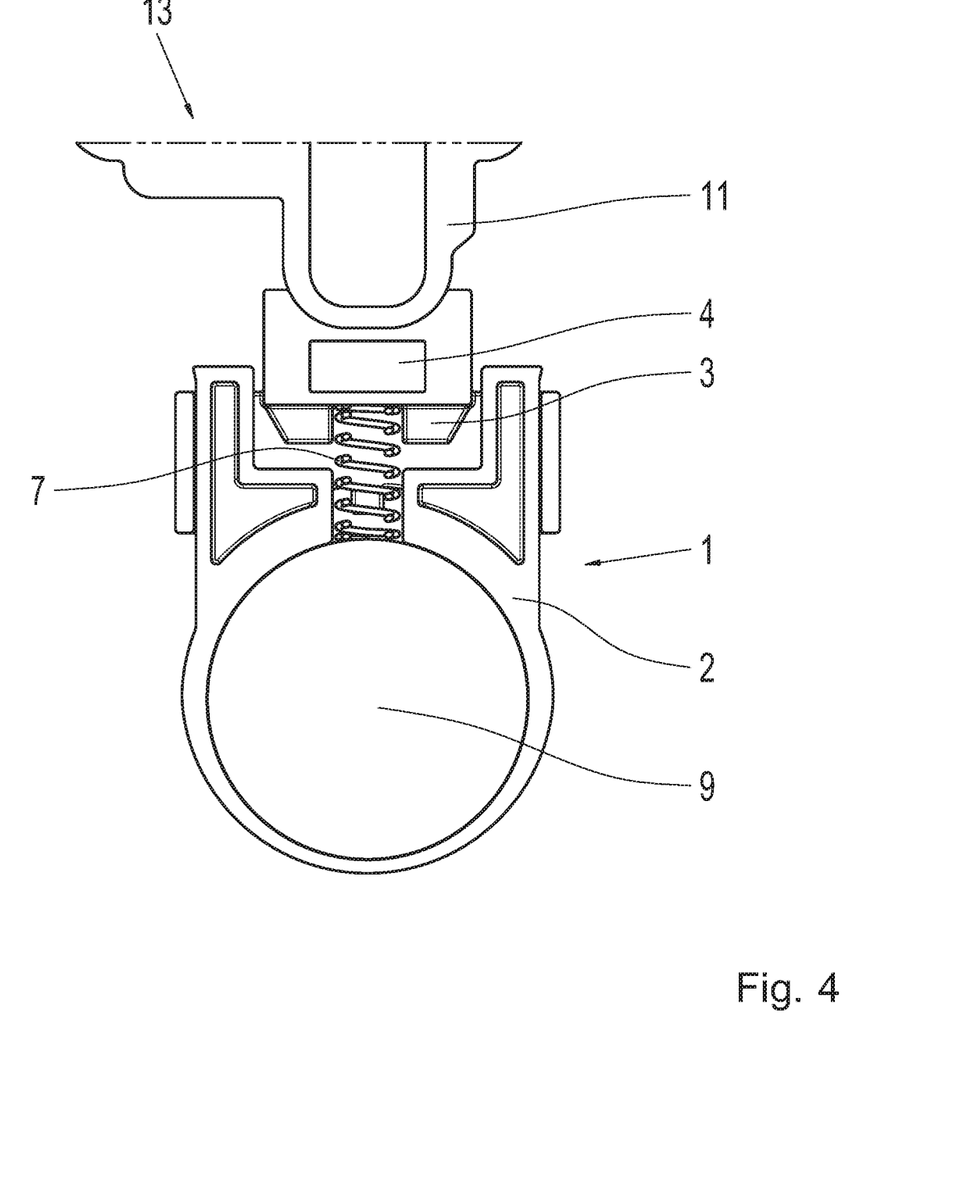
FIG. 4: A second sectioned view through the fitted transducer magnet assembly.

FIG. 3 shows in detail the locking of the coupling ring 2 by the magnet support 3. The magnet support 3 is again mounted on the coupling ring 2 and is held onto the coupling ring 2 by the lips 6. At the same time, however, as described already the magnet support 3 can be displaced axially relative to the shifting rail 9 along an axis. In FIG. 3 this is shown with the help of an arrow for the movement directions 10. A spring element 7, namely a compression spring, presses the magnet support 3 away from the shifting rail 9 and thus toward the sensor element 11, which is shown in FIG. 4. This ensures an optimum contact between the magnet support 3 and the transducer magnet 4 and the sensor element 11.

FIG. 4 shows a second sectioned view through the fitted transducer assembly 1 in an overall view of the path sensor arrangement 13. In this case the sensor element 11 is in contact with the transducer magnet 4 and/or the magnet support 3, depending on whether the transducer magnet 4 is fully or only partially embedded in the magnet support 3. In the example illustrated here, the transducer magnet 4 is only partially enclosed by the magnet support 3 so the sensor element 11 is in contact with the transducer magnet 4 and the magnet support 3. The rotations of the shifting rail 9 are compensated between the coupling ring 2 and the shifting rail 9. The coupling ring 2 is supported in the circumferential direction against the sideplates 12 of the magnet support 3 relative to the sensor element 11.

Figure 5:
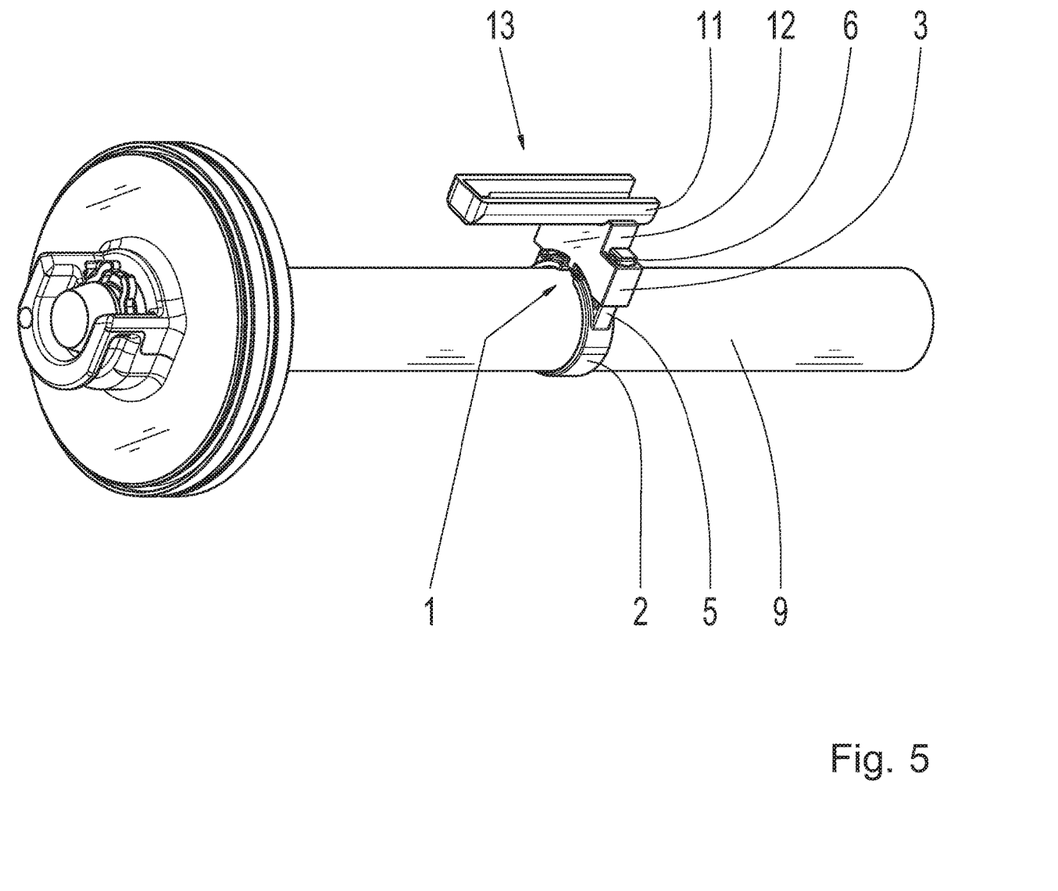
FIG. 5: Overall structure of a path sensor arrangement with a transducer magnet assembly according to the invention.

FIG. 5 shows a path sensor arrangement 13 with a transducer magnet assembly 1 as installed. The coupling ring 2 surrounds the shifting rail 9. The magnet support 3 surrounds the transducer magnet 4 and locks the coupling ring 2. At the same time, the sideplates 12 of the magnet support 3 serve to make contact with the sensor element 11. Here, the magnet support 3 can be displaced on the raised portions 5 of the coupling ring 2, and a spring force of the spring element 7 presses the magnet support 3 in the direction toward the lips 6 of the coupling ring 2 and hence, in the assembled condition, in the direction toward the sensor element 11.

INDEXES

1 Transducer magnet assembly
2 Coupling ring
3 Magnet support
4 Transducer magnet
5 Raised portion
6 Lip
7 Spring element
8 Interior ridge
9 Shifting rail
10 Movement direction
11 Sensor element
12 Sideplates of the magnet support
13 Path sensor arrangement
14 Groove/recess

The invention claimed is:

1. A transducer magnet assembly on a shifting rail which defines an axis, the transducer magnet assembly comprising:
an annular coupling ring,
a transducer magnet being held by a magnet support,
the coupling ring at least substantially, circumferentially surrounding the shifting rail, and the coupling ring and the shifting rail are coaxially aligned along the axis, and
the magnet support locking the coupling ring on the shifting rail such that the coupling ring directly engages the shifting rail and is axially fixed to the shifting rail, and the magnet support is moveable, relative to the shifting rail and the coupling ring, along a perpendicular axis that is perpendicular to the axis defined by the shifting rail.

2. The transducer magnet assembly according to claim 1, wherein the magnet support at least partially accommodates the transducer magnet.

3. The transducer magnet assembly according to claim 1, wherein the coupling ring has projections extending therefrom and each of the projections has at least one lip, the magnet support receives the projections and locks the coupling ring by a snap-on connection such that the lips of the projections communicate with the magnet support and prevent release of the magnet support from the coupling ring.

4. The transducer magnet assembly according to claim 1, wherein at least one of the coupling ring and the magnet support is made as an injection molded plastic.

5. The transducer magnet assembly according to claim 4, wherein the transducer magnet is completely embedded within the magnet support such that an entirety of the transducer magnet is enclosed by the magnet support.

6. The transducer magnet assembly according to claim 1, wherein the transducer magnet assembly comprises a spring element, the spring element applies a spring force along the perpendicular axis and biases the magnet support perpendicularly to the axis defined by the shifting rail away from the shifting rail for compensation of sensor tolerances.

7. The transducer magnet assembly according to claim 6, wherein the spring element is arranged in a direction along the perpendicular axis between the shifting rail and the magnet support.

8. The transducer magnet assembly according to claim 6, wherein the spring element extends along the perpendicular axis in a direction perpendicular to the axis defined by the shifting rail and is arranged centrally in the magnet support.

9. A path sensor arrangement comprising a transducer magnet assembly according to claim 1 and a sensor element, wherein the transducer magnet assembly is supported radially in a circumferential direction of the shifting rail against the sensor element.

10. The path sensor arrangement according to claim 9, wherein the shifting rail has a groove and the coupling ring has an inner ridge that mates with the groove such that the coupling ring and the shifting rail are axially fixed relative to each other.

11. A method for mounting a transducer magnet assembly on a shifting rail, which defines an axis, having a transducer magnet held by a magnet support, a coupling ring, the coupling ring surrounds the shifting rail and the magnet support locks the coupling ring so that the coupling ring is axially fixed to the shifting rail, the method comprising:
expanding the coupling ring;
pushing the coupling ring onto the shifting rail; and
locking the coupling ring on the shifting rail with the magnet support such that the coupling ring directly engages the shifting rail and is axially fixed to the shifting rail, and the magnet support is moveable, relative to the shifting rail and the coupling ring, along a perpendicular axis that is perpendicular to the axis defined by the shifting rail.

12. The mounting method according to claim 11, further comprising pushing the coupling ring onto the shifting rail until an interior radius or an interior ridge of the coupling ring is received into a corresponding groove or recess in the shifting rail that extends in a circumferential direction about the shifting rail and the expansion of the coupling ring is thereby at least partially relaxed.

13. The mounting method according to claim 11, further comprising assembling the magnet support and a spring element by fitting the spring element into the magnet support,
holding the spring element in position in the magnet support by a magnetic force, and
installing the spring element as a structural unit together with the magnet support such that the spring element is arranged in a direction along the perpendicular axis between the shifting rail and the magnet support.

14. The mounting method according to claim 11, further comprising assembling the magnet support and a spring element by fitting the spring element into the magnet support,
holding the spring element in position by at least one further holding lip, and
installing the spring element as a structural unit together with the magnet support such that the spring element is arranged in a direction along the perpendicular axis between the shifting rail and the magnet support.

15. The mounting method according to claim 11, further comprising plugging a structural unit comprising the magnet support and a spring element onto the coupling ring against a spring force that is applied by the spring element along the perpendicular axis, and locking the coupling ring by a snap-on connection.

* * * * *